UNITED STATES PATENT OFFICE.

ALAN A. CLAFLIN, OF MEDFORD, MASSACHUSETTS.

PROCESS OF UTILIZING ZINC-SULFITE SLUDGE.

994,502.

Specification of Letters Patent. Patented June 6, 1911.

No Drawing. Application filed February 14, 1911. Serial No. 608,639.

*To all whom it may concern:*

Be it known that I, ALAN A. CLAFLIN, a citizen of the United States, residing at Medford, in the county of Middlesex and Commonwealth of Massachusetts, have invented a new and useful Method of Treating the Residual Sludge of Hyposulfite-Indigo Vats.

One of the most approved modes of dyeing with indigo is that known as the hyposulfite or hydrosulfite process, wherein the indigotin of this blue dyestuff is converted into indigo-white by the reducing action of zinc dust in the presence of sodium bisulfite when all these ingredients are kept thoroughly mixed together in an aqueous menstruum rendered alkaline by the addition of slaked lime within a dye-vat. The reduced indigo dissolves in the alkaline solution and in this soluble state it is enabled to saturate the textile fibers introduced into the vat, but upon being exposed to the air when the goods thus dyed leave the vat, it is again oxidized into indigotin which remains fixed on the fibers as a substantive blue coloring matter. Meantime the insoluble residual matters resulting from the chemical reactions which take place, and accumulating in the aqueous menstruum, when left at rest subside to the bottom of the vat in the condition of a sludge, which hitherto has been thrown away as a waste product. Such sludge usually contains upon the average from 25 to 35 per cent. of zinc in the form of various chemical compounds, principally zinc sulfite ($ZnSO_3$); but the difficulties of recovering the zinc from this sludge in a commercially available mode have been so great that all of it amounting to many hundreds of tons yearly has been lost to the industries.

An alternative mode of preparing a hyposulfite indigo vat has been adopted in modern practice, whereby the aqueous solution resulting from the introduction therein of the proper quantities of zinc dust, sodium bisulfite and slaked lime is filtered at the outset, and the clear liquor is afterward used in the dye-vat to reduce and dissolve the indigo added thereto. In this case the sludge is obtained by the preliminary filtration, but it may nevertheless be regarded as a residuum of the contents of the vat.

My invention has for its object primarily, the recovery of the zinc contained in the sludge of the hyposulfite indigo vat in such chemical condition as to render it easily convertible into readily available compounds or into its metal base; and secondarily, the simultaneous obtainment of sodium sulfite. For this purpose I boil the sludge in a concentrated solution of commercial sodium carbonate ($Na_2CO_3$) known as soda ash. The solution I prefer to use contains about one pound of soda ash to one gallon of water; but of course its degree of concentration is only a question of relative dilution of the products of reaction. I use enough of this solution to combine with the sulfurous acid in the sludge according to the equation

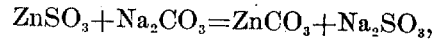
$$ZnSO_3 + Na_2CO_3 = ZnCO_3 + Na_2SO_3,$$

or I may employ a slight excess over that theoretically required to combine with all the sulfurous acid present. The time of boiling the sludge will depend upon the relative compactness or lumpiness of the mass; but I find that about one hour ordinarily suffices. After it has been boiled sufficiently long to complete practically the reaction hereinabove indicated, the resulting solution with the undissolved residue of the sludge in suspension is drawn off and filtered, preferably by the aid of a filter-press. The clear solution thus obtained contains principally sodium sulfite, and this may be used as a basis for the production of sodium bisulfite by charging it with sulfur dioxid or may be evaporated to crystallize out the solid sodium sulfite or may be boiled with an addition of sulfur to form sodium thiosulfate commercially known as hyposulfite of soda. For all of these purposes the sulfurous acid thus extracted from the zinc sludge constitutes a valuable and available ingredient. The zinc carbonate contained in the residue filtered out of the solution resulting from boiling the sludge with soda ash is in available form to be treated by any of the following modes of procedure, namely: (1) Zinc sulfate may be made by dissolving it in dilute sulfuric acid and afterward evaporating the solution; (2) zinc oxid may be produced by roasting it in contact with atmospheric air; or (3) metallic zinc may be obtained from it by reduction in a proper muffle. The small quantities of sulfur and lime remaining in the residue of the sludge offer no difficulties to such treatment of the zinc carbonate therein.

A concrete exemplification of my invention may be described as follows: 500 pounds of the sludge from a hyposulfite indigo vat, in the form of a paste which contains, as zinc sulfite, 28 per cent. of zinc oxid and 22 per cent. of sulfur dioxid, together with about one per cent. of lime and one per cent. of sulfur, is boiled in a vessel provided with a mechanical stirrer, with 200 gallons of water in which is dissolved 190 pounds of soda ash. After boiling for one hour the resulting aqueous constituent is principally a solution of sodium sulfite and the insoluble residue contains chiefly zinc carbonate, both of which are in condition to be readily utilized. Thus, for instance, after cooling and settling the clear solution is filtered off and charged with additional sulfur dioxid to make sodium bisulfite for further use in a hyposulfite indigo vat, and the residual solid matter is separately dissolved in 185 gallons of ten per cent. sulfuric acid. This latter solution is then filtered and evaporated to a specific gravity of 1.35 and the zinc sulfate is crystallized out for appropriate subsequent use.

I claim:—

1. The method of converting the zinc sulfite contained in the residual sludge of a hyposulfite indigo-vat, into zinc carbonate, which method consists in boiling such sludge in a solution of soda ash.

2. The process of simultaneously producing zinc carbonate and sodium sulfite, which process consists in the reaction of sodium carbonate upon zinc sulfite.

3. The process of obtaining sodium sulfite from zinc sulfite, which process consists in boiling the latter in an aqueous solution of sodium carbonate.

ALAN A. CLAFLIN.

Witnesses:
GEORGE L. ROBERTS,
FLORENCE A. COLLINS.